United States Patent [19]
Gunter et al.

[11] 3,991,039
[45] Nov. 9, 1976

[54] ONE PART CURING COMPOSITIONS FOR MERCAPTAN POLYMERS

[75] Inventors: Edmund J. Gunter, Glendora; Melvin B. Young, Canyon Country, both of Calif.

[73] Assignee: Products Research & Chemical Corporation, Burbank, Calif.

[22] Filed: Feb. 12, 1975

[21] Appl. No.: 549,363

[52] U.S. Cl. .............................. 260/79; 260/33.6 R; 260/37 R; 260/79.1
[51] Int. Cl.² ............................................ C08F 28/00
[58] Field of Search ............................ 260/79, 79.1

[56] References Cited
UNITED STATES PATENTS

| | | | |
|---|---|---|---|
| 3,219,638 | 11/1965 | Warner | 260/79 |
| 3,225,017 | 12/1965 | Seegman et al. | 260/79 |
| 3,278,496 | 10/1966 | Le Fave et al. | 260/79 |
| 3,629,206 | 12/1971 | Stephenson et al. | 260/79 |
| 3,637,574 | 1/1972 | Millen | 260/37 R |

*Primary Examiner*—Melvyn I. Marquis
*Attorney, Agent, or Firm*—Poms, Smith, Lande & Glenny

[57] ABSTRACT

Single component liquid mercaptan containing polymers having at least two terminal mercaptan groups can be cured rapidly by exposure to atmospheric oxygen in the presence of (1) a thiuram and an iron or manganese salt, oxide, hydroxide or metal complex or (2) an iron or manganese dithiocarbamate. A synergistic effect is obtained when calcium peroxide is added to either or both of the above curing systems.

9 Claims, No Drawings

ONE PART CURING COMPOSITIONS FOR MERCAPTAN POLYMERS

BACKGROUND OF THE INVENTION

Liquid mercaptan polymers having at least two terminal mercaptan groups can be easily cured at room temperature to rubber elastomers having excellent resistance to weathering, oil, ozone, and water. Because of these properties polymers having at least two terminal mercaptan groups have been widely used as sealants and adhesives as well as in many other applications.

However, even though mercaptan liquid terminated polymers may be cured to elastomers having very desirable properties; they have, in the past, suffered the disadvantage that a "curing agent" had to be added just prior to use.

Because of this disadvantage, it is not surprising that prior art workers have attempted to develop curing systems wherein the mercaptan-terminated liquid polymer could be formulated with curing agents and the resulting composition cured without further admixture of any ingredients by merely depositing the composition in the location where it is to be used. Such a one-part system is exemplified in U.S. Pat. No. 3,225,017 wherein a liquid polysulfide polymer is cured by merely exposing it to an atmosphere containing moisture thus allowing the polysulfide polymer to be cured without agitation or further mixing with other ingredients. U.S. Pat. No. 3,225,017 accomplishes the foregoing by adding an alkali metal or alkaline earth metal peroxide together with an alkaline hygroscopic stabilizer.

The curing agents in U.S. Pat. No. 3,225,017, although being generally satisfactory, do have one serious disadvantage in that such curing agents require a great deal of moisture thereby preventing their use in relatively arid climates having low relative humidity such as climates found in Southern California. Cures are especially slow when calcium oxide is used as the only alkaline stabilizer.

SUMMARY OF THE INVENTION

The present invention is based, in part, on the surprising discovery that when certain curing agents are added to liquid mercaptan containing polymers, they may be cured merely upon exposure to an oxygen containing atmosphere thus making such a curing system independent of moisture and relative humidity. Moreover, the curing agents of the present invention are not strongly alkaline so that it is possible to utilize aluminum pigmentation and, just as importantly, the compositions of the present invention may contact aluminum surfaces without causing corrosion.

The compositions of the present invention, when protected from oxygen, are stable for indefinite periods of time; but, as noted above, are capable of being cured to a tack-free, solid, rubbery polysulfide elastomer at room temperature without agitation or intermixing with any other material by merely contacting the surface of said composition with an environment containing oxygen, e.g. air.

DESCRIPTION OF THE PREFERRED EMBODIMENT

The curing agents of the present invention are basically of two types. The first type utilizes a thiuram in conjunction with an iron or manganese oxide, hydroxide, salt or metal complex. This combination of compounds will cure air-exposed mercaptan terminated liquid polymers having at least two terminal groups to solid polysulfides but, when mixed with such mercaptan-terminated polymers and hermetically stored, show indifinite stability. Moreover, such curing agents even when mixed with the liquid mercaptan-terminated polymers, are insensitive to atmospheric moisture which greatly simplifies the manufacture of such compositions. Additionally, mercaptan-terminated liquid polymer cured with such agents shows reduced age hardening when compared to the systems disclosed in U.S. Pat. No. 3,225,071 (particularly when compared to barium oxide stabilized systems).

The preferred thiuram compounds are thiuram disulfides which may have the formula:

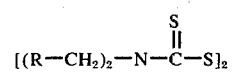

wherein R is a member selected from the group consisting of hydrogen, lower alkyl, aryl, and heterocyclic. Exemplary of thiuram disulfide compounds that can be utilized as curing agents in the present invention (in conjunction with iron or manganese compounds) are tetramethyl thiuram disulfide, tetraethyl thiuram disulfide, tetraisopropyl thiuram disulfide, tetrabutyl thiuram disulfide, tetrabenzyl thiuram disulfide, and tetra(2-isooxazole) thiuram disulfide.

The iron and manganese compounds utilized in conjunction with the disulfide thiuram can be: (1) iron and manganese oxides such as ferric oxide, ferrous oxide, manganous oxide, and manganic oxide; (2) iron and manganese hydroxides such as ferrous hydroxide and manganous hydroxide; (3) inorganic salts of iron and manganese such as those formed from halogens (e.g., ferric chloride and manganous chloride) and other inorganic anions such as ferrous sulfate, ferric nitrate, manganic sulfate and manganous nitrate; (4) organo-salts of iron and manganese such as those formed from organic carboxylic acids, for example, ferric acetate, manganic linaleate, ferric octoate, and ferric nahthenates; and (5) iron and manganese metal complexes such as acetyl acetonate complex of iron or manganese.

Surprisingly, although certain metal salts (e.g. copper, cadium, bismuth, lead and zinc) will function at elevated temperatures only iron and manganese compounds produce stable products with good cures. Moreover, only small amounts of the iron or manganese compounds are necessary to produce cures so that satisfactory light-colored compositions are obtainable.

The amount of the curing system (i.e. the thiuram in conjunction with the manganese or iron compounds) described above can vary due, in part, to the fact that the curing system is inactive when the composition is kept free of oxygen.

The specific amount of thiuram may vary from 0.2 parts by weight (preferably at least 0.5 parts by weight) to 3 parts by weight while in the case of the metal compounds, (i.e. the iron or manganese compounds) from 0.05 to 3 or 5 parts by weight have been used successfully (again based on 100 parts by weight of mercaptan-terminated liquid polymer). In the case of the metal oxides, there is no upper limit but we have found that 5 to 10 parts work satisfactorily and have used 50 to 100 parts.

A second curing agent, useful in the present invention is the dithiocarbamates which possess the same properties as the curing system above in that the dithiocarbamates will cure mercaptan-terminated liquid polymers having at least two terminal mercaptan groups to solid polysulfides but, when mixed with such mercaptan-terminated polymers and hermetically stored, show indefinite stability. Moreover, the dithiocarbamate curing agents are insensitive to atmospheric moisture, and the resulting cured liquid polymer shows reduced age hardening when compared to the systems disclosed in the U.S. Pat. No. 3,225,017.

The specific dithiocarbamates useful in the present invention are iron dithiocarbamate and manganese dithiocarbamate and, preferably, have the following formula:

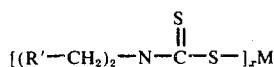

wherein R' is a member selected from the group consisting of hydrogen, lower alkyl, aryl and heterocyclic; x is a positive integer of from 2 to 3; and M is a metal selected from the group consisting of iron and manganese.

Particularly useful compounds are those wherein R' is hydrogen (e.g. ferric dimethyl dithiocarbamate), methyl (e.g. manganic diethyl dithiocarbamate), propyl (e.g. ferric dibutyl dithiocarbamate), and phenyl (e.g. ferrous dibenzyl dithiocarbamate).

The amount of dithiocarbamate is not particularly critical but does have a slightly more limited range than the first system, partly because of higher coloration and rapid cures which may cause some handling difficulties. For example, the amount of dithiocarbamate can vary from as little as 0.2 or 0.5 parts by weight to 3 parts by weight per 100 parts by weight of liquid mercaptan-terminated polymer.

The particular mercaptan-terminated polymers which can be cured by the present invention are any liquid mercaptan-terminated polymers having at least two terminal (reactive) mercaptan groups and, preferably, from two to four terminal mercaptan groups. Exemplary of mercaptan-terminated liquid polymer are those found in U.S. Pat. Nos. 2,466,963; 2,474,859; 3,138,573; 3,431,239 and 3,503,930.

The molecular weight of the liquid terminal-mercaptan polymers may vary widely (for example, from 200 to as high as 40,000), and are preferably from around 1,000 to 10,000. Similarly, their viscosity may vary from as little as 50 centipoises to as high as 200,000,000 centipoises with the preferable viscosity varying from 100 to 500,00 centipoises.

The physical and chemical properties of the cured composition of the present invention can be varied to produce a product useful as a sealant, coating, or adhesive. This can, in part, be accomplished by the particular starting mercaptan-terminal liquid polymer and by the addition of various additives such as fillers, pigments, plasticizers, reinforcing agents and modifying resins.

It should also be noted that the compositions of the present invention (particularly the curing systems) exhibit a synergistic effect when combined with calcium peroxide disclosed in U.S. Pat. No. 3,225,017. In general, when soluble alkaline metal peroxides, oxides and/or hydroxides are added to the curing systems of the present invention, unlike the results of U.S. Pat. No. 3,225,017, the compositions show a gradual viscosity increase and gelling even if the systems are dry.

In order to fully illustrate the invention there is given below the presently preferred embodiments, their curing and storage characteristics, and certain formulations which are not operable due either to excessively long cure periods or instability on storage.

EXAMPLE I

A polyaklylene polysulfide having a molecular weight of about 4,000, a viscosity of about 4,000 poises and 0.5% crosslinking (LP-32 from Thiokol Chemical Corp.) is used in this Example.

|  | Parts by Weight |
| --- | --- |
| LP-32 | 100.00 |
| Calcium carbonate | 65.00 |
| Titanium dioxide (pigment) | 20.00 |
| Polyalpha-methyl styrene (plasticizer, Dow V-9) | 40.00 |
| Tetramethyl thiuram disulfide | 0.67 |
| Manganous oxide | 1.00 |

The above material was tack-free in 4 hours. It showed approximately a 1/16 inch cure through rate on exposure to air in 60 days. There was no observable viscosity change after accelerated aging in a sealed cartridge for 90 days at 120° F.

To illustrate the importance of the metallic compound, the manganous oxide was deleted in the following Example II.

|  | Parts by Weight |
| --- | --- |
| LP-32 | 100.00 |
| Calcium Carbonate | 65.00 |
| Titanium dioxide | 20.00 |
| Polyalpha-methyl styrene | 40.00 |
| Tetramethyl thiuram disulfide | 0.67 |

This composition is not operable in that there was no evidence of skin or cure after exposure to air at room temperature.

To illustrate the importance of the thiuram compound, the tetramethyl thiuram disulfide was deleted in the following Example III.

EXAMPLE III

|  | Parts by Weight |
| --- | --- |
| LP-32 | 100.00 |
| Calcium Carbonate | 65.00 |
| Titanium dioxide | 20.00 |
| Polyalpha-methyl styrene | 40.00 |
| Manganous oxide | 1.00 |

The above composition, though giving a product which skinned upon exposure to air at room temperature, did not cure through.

|  | Parts by Weight |
| --- | --- |
| LP-32 | 100.00 |
| Calcium carbonate | 65.00 |
| Titanium dioxide | 20.00 |
| Polyalpha-methyl styrene | 40.00 |

-continued

| | Parts by Weight |
|---|---|
| Ferric dimethyl dithiocarbamate | 0.80 |

This material cured to a tack-free condition in one-half hour when exposed to the air at room temperature. Its cure through rate was 1/16 inch after 60 days. There were no observable changes in viscosity after 90 days accelerated aging in a sealed cartridge at 120° F.

Further increase in cure rate is noted by combining agents as follows:

EXAMPLE V

| | Parts by Weight |
|---|---|
| LP-32 | 100.00 |
| Calcium carbonate | 65.00 |
| Titanium dioxide | 20.00 |
| Polyalpha-methyl styrene | 40.00 |
| Ferric dimethyl dithiocarbamate | 0.40 |
| Tetramethyl thiuram disulfide | 0.40 |

This material cured to a tack-free condition in 1 hour. Its cure through rate was 3/32 inch after 60 days. There were no observable changes after accelerated aging for 90 days at 120° F in a sealed container.

EXAMPLE VI

| | Parts by Weight |
|---|---|
| Liquid mercaptan-terminated polymer of U.S. patent 3,503,930 with a functionality of 2.5 and a molecular weight of 6,000 | 100.00 |
| Polyalpha-methyl styrene | 15.00 |
| Aluminum pigment (leafing grade No. MD-7100, Metals Disintegrating Co.) | 5.00 |
| Ferric dimethyl dithiocarbamate | 0.80 |

This product was tack-free and glossy aluminum in color after two hours. It showed a cure through rate of 1/16 inch in two weeks.

To illustrate this synergistic effect of calcium peroxide on the cures of this invention, two formulations were prepared — one containing the curing agents of the invention with calcium peroxide added, the other with calcium peroxide alone.

EXAMPLE VII

| | Parts by Weight |
|---|---|
| LP-32 | 100.00 |
| Calcium carbonate (dried) | 65.00 |
| Titanium dioxide (dried) | 20.00 |
| Polyalpha-methyl styrene | 45.00 |
| Calcium peroxide | 10.00 |
| Tetramethyl thiuram disulfide | 0.67 |
| Manganous oxide | 1.00 |
| Accelerated aging for 90 days at 120° F | OK |
| Skin time at 75° F, 40% RH | 4 hours |
| Through cure, room temperature, 60 days | ¼ inch |

EXAMPLE VIII

| | Parts by Weight |
|---|---|
| LP-32 | 100.00 |
| Calcium carbonate (dried) | 65.00 |
| Polyalpha-methyl styrene | 45.00 |
| Calcium peroxide | 10.00 |
| Accelerated aging for 90 days at 120° F | OK |
| Skin time at 75° F, 40% RH | Slight evidence of skin - 24 hrs. |
| Through cure, room temperature, 60 days | Less than 1/32" after 60 days |

Illustration of the incompatibility of the present curing agents with those of U.S. Pat. No. 3,225,017 is shown in Examples IX and X.

EXAMPLE IX

| | Parts by Weight |
|---|---|
| LP-32 | 100.00 |
| Calcium carbonate (dried) | 65.00 |
| Titanium dioxide (dried) | 20.00 |
| Polyalpha-methyl styrene | 45.00 |
| Barium peroxide | 10.00 |
| Tetramethyl thiuram disulfide | 0.67 |
| Manganous oxide | 1.00 |
| Accelerated aging for 90 days at 102° F | Cured in cartridge |
| Skin time at 75° F, 40% RH | ½ hour |
| Through cure, room temperature, 60 days | Unstable |

| | Parts by Weight |
|---|---|
| LP-32 | 100.00 |
| Calcium carbonate (dried) | 65.00 |
| Titanium dioxide (dried) | 20.00 |
| Polyalpha-methyl styrene | 45.00 |
| Calcium peroxide | 10.00 |
| Barium oxide | 6.00 |
| Tetramethyl thiuram disulfide | 0.67 |
| Manganous oxide | 1.00 |
| Accelerated aging for 90 days at 120° F | Cured in cartridge |
| Skin time at 75° F, 40% RH | ½ hour |
| Through cure, room temperature, 60 days | Not determinable - gels |

The examples given are illustrative. Many other standard pigments, plasticizers and adhesion promoters can be incorporated to give a complete range of useful products, as is well known in the art.

We claim:

1. A mercaptan-terminated liquid polymer composition protected from oxygen which is stable indefinitely and is capable of being cured to a tack-free, solid, rubbery polysulfide elastomer at room temperature without agitation or intermixing with other materials solely by contact of its surface with an environment containing oxygen, said composition consisting essentially of a substantially uniform admixture of (a) a liquid mercaptan-terminated polymer having at least two terminal mercaptan groups and (b) a curing agent in an amount sufficient to cure said liquid polymer which is activated by the presence of oxygen, said curing agent being selected from the group consisting of (1) a thiuram disulfide in conjunction with a member selected from the group consisting of an iron salt, iron oxide, iron hydroxide, iron metal complex, manganese salt, manganous oxide, manganese hydroxide, and manganese metal complex and (2) a dithiocarbamate selected from the group consisting of iron dithiocarbamate and manganese dithiocarbamate.

2. A composition as set forth in claim 1 wherein said environment is atmospheric air.

3. A composition according to claim 2 wherein said liquid mercaptan-terminated polymer is a liquid polyakylene polysulfide polymer.

4. A composition according to claim 1 wherein the curing agent is component (1) and said thiuram has the formula

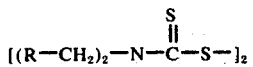

wherein R is a member selected from the group consisting of hydrogen, lower alkyl, aryl, and heterocyclic.

5. A composition according to claim 4 wherein R is hydrogen.

6. A composition according to claim 1 wherein the curing agent is component (2) and said dithiocarbamate has the formula

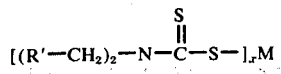

wherein R' is a member selected from the group consisting of hydrogen, lower alkyl, aryl and heterocyclic; $x$ is a positive integer of from 2 to 3; and M is a metal selected from the group consisting of iron and manganese.

7. A composition according to claim 6 wherein R' is hydrogen.

8. A composition according to claim 6 wherein M is ferric.

9. A composition according to claim 2 wherein the composition also contains calcium peroxide.

* * * * *